(12) United States Patent
Yokota

(10) Patent No.: US 7,674,193 B2
(45) Date of Patent: Mar. 9, 2010

(54) GOLF BALL

(75) Inventor: Masatoshi Yokota, Kobe (JP)

(73) Assignee: SRI Sports Limited, Kobe (JP)

( * ) Notice: Subject to any disclaimer, the term of this patent is extended or adjusted under 35 U.S.C. 154(b) by 151 days.

(21) Appl. No.: 10/601,652

(22) Filed: Jun. 24, 2003

(65) Prior Publication Data

US 2004/0029652 A1 Feb. 12, 2004

(30) Foreign Application Priority Data

Jun. 26, 2002 (JP) ............................. 2002-186539

(51) Int. Cl.
*A63B 37/12* (2006.01)
*A63B 37/04* (2006.01)
(52) U.S. Cl. ..................... 473/378; 473/377
(58) Field of Classification Search .......... 473/351–378
See application file for complete search history.

(56) References Cited

U.S. PATENT DOCUMENTS

| 3,830,785 | A | * | 8/1974 | Matsui et al. .................. 528/45 |
| 5,334,673 | A | | 8/1994 | Wu |
| 5,908,358 | A | * | 6/1999 | Wu .............................. 473/378 |
| 6,132,324 | A | * | 10/2000 | Hebert et al. ................ 473/378 |
| 6,210,294 | B1 | * | 4/2001 | Wu .............................. 473/377 |
| 6,379,266 | B1 | * | 4/2002 | Ogg et al. .................... 473/358 |
| 6,867,279 | B2 | | 3/2005 | Wu |
| 7,148,278 | B2 | | 12/2006 | Bulpett et al. |

FOREIGN PATENT DOCUMENTS

| JP | 2002078824 A | * | 3/2002 |
| JP | 2002-102390 A | | 4/2002 |
| JP | 2002-159596 A | | 6/2002 |
| WO | WO 01/43832 A1 | | 6/2001 |

\* cited by examiner

*Primary Examiner*—Alvin A Hunter
(74) *Attorney, Agent, or Firm*—Birch, Stewart, Kolasch & Birch, LLP

(57) ABSTRACT

The golf ball of the present invention comprises a cover wherein the cover is made from a cover material including a cured product of the thermosetting resin composition; and the stiffness modulus and shore D hardness of the cover material satisfy a following equation.

$$2.0 \leq A/B \leq 5.0, 40 \leq B \leq 60$$

A: Stiffness modulus (MPa)
B: Shore D hardness.

9 Claims, No Drawings

GOLF BALL

BACKGROUND OF THE INVENTION

1. Field of the Invention

The present invention relates to a golf ball which exhibits an excellent controllability, shot feeling, durability and flight distance.

2. Description of the Related Art

As conventional golf ball, a wound-core golf ball with a Balata rubber cover and a multi-piece golf ball with an ionomer resin cover are well-known. The wound-core golf ball with a Balata rubber cover is widely used by high-level amateur golfers and professional golfers, because they have superior shot feeling and controllability. However, the golf ball with a balata rubber cover is expensive because of a complicated process, and the golf ball has a problem of a durability and cut resistance. The multi-piece golf ball with an ionomer cover is also widely used, because of good durability and fright performance. But it has been pointed out that the shot feeling and controllability of the golf ball with ionomer cover is inferior to the golf ball with Balata rubber cover.

In view of the foregoing circumstances, it is desired that the golf ball exhibits the feel and control which the Balata rubber cover imparts as well as the durability and flight performance which the ionomer cover does. For example, Japanese unexamined patent publication No. 2002-102390 discloses the golf ball excellent in repulsion property (flight performance), durability and spin rate (controllability). The golf ball is characterized in that the cover satisfies the specific relationship between stiffness modulus and Shore D hardness by containing an organic fiber in covering material including thermoplastic resin or a thermoplastic elastomer.

Further, Japanese Patent No. 2662909 proposes a golf ball with a polyurethane cover which is excellent in durability, repulsion property and controllability.

In the golf ball disclosed in Japanese unexamined patent publication No. 2002-102390, the organic fiber is contained in the cover material including a thermoplastic resin or a thermoplastic elastomer. Use of the organic fiber causes to lower repulsion property and flight performance. And, Japanese patent No. 2662909 has disclosed a golf ball which has a polyurethane cover formed by curing a urethane prepolymer with a slow-reactive polyamine curing agent. However, the golf ball with a resultant polyurethane cover is not satisfactory in term of flight performance.

SUMMARY OF THE INVENTION

The present invention has been made in view of the foregoing circumstances. Accordingly, it is an object of the present invention to provide a golf ball which exhibits the feel and control which the Balata rubber cover imparts as well as the durability and flight performance which the ionomer cover does, without using a thermoplastic resin or an organic fiber as a cover material.

According to the present invention, there is provided a golf ball comprises a cover, wherein the cover is made from a cover material including a cured product of a thermosetting resin composition; and the stiffness modulus and shore D hardness of the cover material satisfy a following equation.

$$2.0 \leq A/B \leq 5.0, 40 \leq B \leq 60$$

A: Stiffness modulus (MPa)
B: Shore D hardness

The stiffness modulus (A) represents a modulus of rigidity of the cover material when the cover transforms due to shot, and that indicate the deformation amount of the cover. The stiffness modulus (A) indicates stiffness of the cover material and represents the deformation amount of the cover when the cover transforms due to the shot. And Shore D hardness (hereinafter simply referred to as a "hardness (B)") represents the hardness of the cover surface (disregarding the deformation amount of the golf ball due to shot). And the inventors of the present invention have found that the relationship between Shore D hardness (B) and stiffness modulus (A) of the cover material has a following effect on the golf ball property. If the stiffness modulus (A) is too small relative to the hardness (B), the energy, which is provided to the golf ball by the shot, will be considerably consumed by the large deformation of the cover. As a result, the flight distance of the golf ball becomes lower.

On the other hand, if the stiffness modulus (A) is too high relative to the hardness (B), the deformation amount of the cover in approach shot with wedge is so small, resulting in the lower spin rate. As a result, controllability of the golf ball becomes lower. In view of these points, in the present invention, the flight performance of the golf ball is consistent with controllability by adjusting the ratio of the stiffness modulus (A) to the hardness (B) A/B between 2.0 and 5.0. Further, the Shore D hardness (B) is adjusted to fall within the range from 40 to 60, preferably 45 to 55. The resulting ball exhibits satisfactory shot feeling and controllability.

DETAILED DESCRIPTION OF THE PREFERRED EMBODIMENTS

The golf ball of the present invention comprises a cover, wherein the cover is made from a cover material including a cured product of a thermosetting resin composition; and the stiffness modulus (A) and shore D hardness (B) of the cover material satisfy the following equation.

$$2.0 \leq A/B \leq 5.0, 40 \leq B \leq 60$$

A: Stiffness modulus (MPa)
B: Shore D hardness

In the present invention, as mentioned above, the ratio of the stiffness modulus (A) to the Shore D hardness (B) (A/B) falls within the range of from 2.0 to 5.0, preferably 2.0 to 4.0. If the ratio (A/B) is less than 2.0, in other words, the stiffness modulus (A) is too small relative to the hardness (B), thus flight distance becomes short. If the ratio (A/B) is more than 5.0, the stiffness modulus (A) is too large for hardness (B), the controllability of the golf ball becomes low.

The cover material has Shore D hardness (B) of not less than 40, preferably not less than 45, and has Shore D hardness of not more than 60, preferably not more than 55. If the Shore D hardness (B) of the cover material is more than 60, the cover is so hard that the resulting golf ball imparts larger impact to the golfer upon shot and exhibits a lower controllability because of the low spin rate. While, if Shore D hardness is less than 40, the cover is so soft that the resulting golf ball tends to impart a poor shot feeling to the golfer. And the cover material preferably has a stiffness modulus of 80 MPa or more, more preferably 100 MPa or more, and preferably has a stiffness modulus of 260 MPa or less, more preferably 200 MPa or less. Adjusting the stiffness modulus in the above preferable range imparts the excellent balance between flight performance and durability, controllability and shot feeling to the resulting golf ball.

The golf ball of the present invention uses a cured product of the thermosetting resin composition as a cover material. The durability of the cured product of the thermosetting resin composition is superior to a thermoplastic resin. In addition, the cured product of the thermosetting resin composition has high stiffness modulus relative to the Shore D hardness, it is readily to satisfy the aforementioned equation. The thermosetting resin composition, for example, comprises a base resin including the thermosetting resin and a curing agent. And the term of "thermosetting", as used herein, is not limited to require heating through the reaction, but also includes the curing at the room temperature. Examples of the thermosetting resin composition are a thermosetting urethane resin composition, a thermosetting epoxy resin composition, a vinyl ether resin composition and an unsaturated polyester resin composition. Among them, the thermosetting urethane resin composition is particularly preferable. Since the curing product of the thermosetting urethane resin composition is excellent in the abrasion resistance, the durability that is required against the club face and the ground will be improved.

The present invention will now be described in detail, with respect to the embodiment using the thermosetting urethane resin composition. The thermosetting urethane resin composition preferably include an isocyanate group-terminated urethane prepolymer (base resin), which contains an isocyanate component and a polyol component, and a polyamine compound (curing agent). The isocyanate component is not particularly limited. Examples of the isocyanate component are an aromatic diisocyanate such as 2,4-tolylene diisocyanate, 2,6-tolylene diisocyanate, or a mixture thereof (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), and paraphenylene diisocyanate (PPDI); and an alicyclic or aliphatic diisocyanate such as 4,4'-dicyclohexylmethane diisocyanate (hydrogenated MDI), hexamethylene diisocyanate (HDI), cyclohexane diisocyanate and isophorone diisocyanate (IPDI). These may be used either alone or as a mixture of at least two of them. As the isocyanate component, at least one selected from the group consisting of 4,4'-dicyclohexylmethane diisocyanate, cyclohexane diisocyanate and isophorone diisocyanate is preferably used. Since these isocyanate components have no aromatic group, the yellowing resistance of the obtained cover will be improved. And the durability of the resulting cover is improved, because of using alicyclic diisocyanate.

The polyol has no limitation on its molecular weight, as long as it has a plurality of hydroxyl groups. Examples of a low-molecular-weight polyol are a diol such as ethylene glycol, diethylene glycol, triethylene glycol, 1,3-butanediol, 1,4-butanediol, neopentyl glycol, and 1,6-hexanediol; and a triol such as glycerin, trimethylolpropane, and hexanetriol.

Examples of a high-molecular-weight polyol are a polyetherpolyol such as polyoxyethylene glycol (PEG), polyoxypropylene glycol (PPG), and polyoxytetramethylene glycol (PTMG); and a condensed polyetherpolyol such as polyethylene adipate (PEA), polybutylene adipate (PBA), and polyhexamethylene adipate (PHMA); and a lactone polyesterpolyol such as poly-ε-caprolactone (PCL); and a polycarbonate polyol such as poly(hexamethylene carbonate); and acrylic polyol. The polyetherpolyol is preferable as a polyol component of the isocyanate group terminated urethane prepolymer. Use of polyoxytetramethylene glycol (PTMG) is more preferable. Since the resultant cover has superior repulsion property and water resistance.

The polyamine compound used in the present invention has no limitation, as long as it has at least two amino groups. Examples of the polyamine compound are an aliphatic polyamine compound such as ethylenediamine, propylenediamine, butylenediamine, and hexamethylenediamine; and an alicyclic polyamine compound such as isophorone diamine and piperazine; and an aromatic polyamine compound such as a 4,4'-diaminodiphenylmethane derivative and a phenylenediamine derivative.

The aromatic polyamine compound should be selected depending on the kinds of the isocyanate. Specifically, it is preferable to consider the reactivity of the isocyanate group-terminated urethane prepolymer to the polyamine compound. If the reactivity therebetween is so high, the viscosity of the polyurethane composition is likely to increase, and in extreme case, resulting in the gelation. It raises a problem to the workability of production of the cover. On the other hand, in the case that the reactivity is so low, the productivity of the golf ball becomes lower. Because, it takes longer time to form the cover. Further, it is preferable to consider the structure of polyamine compound. For example, the aromatic polyamine compound has a high cohesive force, and imparts the superior mechanical strength to the resulting cured product of the thermosetting urethane resin. As a result, the durability of the cover is improved.

As described above, in the present invention, it is preferable that the isocyanate component comprises at least one selected from the group consisting of 4,4'-dicyclohexylmethane diisocyanate, cyclohexane diisocyanate and isophorone diisocyanate. In the preferable combination with the above isocyanate component, the aromatic polyamine compounds such as the derivative of 4,4'-diaminodiphenylmethane or the derivative of phenylenediamine are used, since the reactivity of the above aromatic polyamine to isocyanate is moderate. And the use of the derivatives of 4,4'-diaminodiphenylmethane improves the durability of the resulting cover. Also, the use of the phenylenediamine derivatives improves the flight performance of the resulting golf ball.

Examples of the derivative 4,4'-diaminodiphenylmethane are alkyl substituted 4,4'-diaminodiphenylmethane derivatives such as a dialkyl substituted 4,4'-diaminodiphenylmethane derivative, a tetraalkyl substituted 4,4'-diaminodiphenylmethane derivative. The alkyl group preferably has 1 to 3 carbon atoms. If the alkyl group has larger number of carbon atoms, the reactivity to the isocyanate group becomes too low. Besides 4,4'-diaminodiphenylmethane, specific examples of the derivatives of 4,4'-diaminodiphenylmethane are an alkyl substituted 4,4'-diaminodiphenylmethane such as 2,2'-dimethyl-4,4'-diaminodiphenylmethane, 3,3'-dimethyl-4,4'-diaminodiphenylmethane, 3,3',5,5'-tetramethyl-4,4'-diaminodiphenylmethane, 2,2'-diethyl-4,4'-diaminodiphenylmethane, 3,3'-diethyl-4,4'-diaminodiphenylmethane, 3,3',5,5'-tetraethyl-4,4'-diaminodiphenylmethane, 2,2'-dipropyl-4,4'-diaminodiphenylmethane, 3,3'-dipropyl-4,4'-diaminodiphenylmethane, 3,3',5,5'-tetrapropyl-4,4'-diaminodiphenylmethane and 3,3'-diethyl-5,5'-dimethyl-4,4'-diaminodiphenylmethane. Among them, 3,3',5,5'-tetraalkyl-4,4'-diaminodiphenylmethane is preferable, and 3,3'-diethyl-5,5'-dimethyl-4,4'-diaminodiphenylmethane is more preferable.

The phenylenediamine derivative includes phenylenediamine, a derivative of monoalkyl phenylenediamine, a derivative of dialkyl phenylenediamine, a derivative of trialkyl phenylenediamine, a derivative of tetraalkyl phenylenediamine. Among them, the derivative of dialkyl phenylenediamine, the derivative of trialkyl phenylenediamine and the derivative of tetraalkyl phenylenediamine are preferable. By controlling the number or the kinds of the substituted alkyl group of the phenylenediamine, it makes readily to adjust the reactivity of the phenylene diamine derivative to the isocyanate group. The location of the amino group is not limited. Examples of such phenylenediamine include a derivative of 1,3-phenylenediamine(m-phenylenediamine), a derivative of 1,4-phenylenediamine(p-phenylenediamine), and a derivative of 1,2-phenylenediamine(o-phenylenediamine). Among them, the derivative of 1,3-phenylenediamine (m-phenylenediamine) and the dialkyl derivative, the trialkyl derivative and the tetraalkyl derivative thereof are preferable. Because the reactivity of 1,3-phenylenediamine to the isocyanate group can be easily controlled by selecting the kinds of the substituent at the 2, 4, 6 position thereof.

Examples of the derivative of 1,3-phenylenediamine are 2,4,6-trimethyl-1,3-phenylenediamine, 2,4,6-triethyl-1,3-phenylenediamine, 2,4,6-tripropyl-1,3-phenylenediamine, 2,4-diethyl-6-methyl-1,3-phenylenediamine, 2,4-dipropyl-6-methyl-1,3-phenylenediamine, 2,4-dimethyl-6-ethyl-1,3-phenylenediamine, 2,4-dipropyl-6-ethyl-1,3-phenylenediamine, 2,4-dimethyl-6-propyl-1,3-phenylenediamine, 2,4-diethyl-6-propyl-1,3-phenylenediamine, 4,6-diethyl-2-methyl-1,3-phenylenediamine, 4,6-dipropyl-2-methyl-1,3-phenylenediamine, 4,6-dimethyl-2-ethyl-1,3-phenylenediamine, 4,6-dipropyl-2-ethyl-1,3-phenylenediamine, 4,6-dimethyl-2-propyl-1,3-phenylenediamine, 4,6-diethyl-2-propyl-1,3-phenylenediamine, 2,6-diethyl-4-methyl-1,3-phenylenediamine, 2,6-dipropyl-4-methyl-1,3-phenylenediamine, 2,6-dimethyl-4-ethyl-1,3-phenylenediamine, 2,6-dipropyl-4-ethyl-1,3-phenylenediamine, 2,6-dimethyl-4-propyl-1,3-phenylenediamine and 2,6-diethyl-4-propyl-1,3-phenylenediamine.

The blending ratio of the isocyanate group-terminated urethane prepolymer to the polyamine compound contained in the thermosetting urethane resin composition is preferably such that the molar ratio of the amino group to the isocyanate group ($NH_2$/NCO) ranges from 0.7, more preferably from 0.8, even more preferably from 0.85, and ranges to 1.20, more preferably to 1.05, even more preferably to 1.00. If the ratio is less than 0.7, the amount of the isocyanate group-terminated urethane prepolymer becomes excess, thus the allophanate or buret bond tends to generate excessively. The excess allophanate or buret bond causes the lack of softness of the resultant polyurethane cover. On the other hand, if the ratio is more than 1.20, since the isocyanate group is lacking, it becomes difficult to generate the allophanate or buret bond. As a result, the amount of the three-dimensional crosslinking points becomes too low, resulting in the poor strength of the obtained polyurethane cover.

The thermosetting urethane resin composition may contain any conventionally known catalyst for use in a urethane reaction in addition to the isocyanate group-terminated urethane prepolymer and the polyamine compound described above. Examples of the catalysts are a monoamine such as triethylamine and N,N-dimethylcyclohexylamine; a polyamine such as N,N,N',N'-tetramethylethylenediamine and N,N,N',N'',N''-pentamethyidiethylenetriamine; a cyclic diamine such as 1,8-diazabicyclo[5,4,0]-7-undecene (DBU) and triethylenediamine; and a tin catalyst such as dibutyltin dilaurylate and dibutyltin diacetate. As required, the thermosetting urethane resin composition may further contain a filler such as barium sulfate, a coloring agent such as titanium dioxide, and other additives such as a dispersant, an antioxidant, an ultraviolet absorber, a light stabilizer, a fluorescent material, and a fluorescent brightener, as long as any desired property is not deteriorated.

The condition for curing the thermosetting urethane resin composition depends on the each type of the isocyanate group-terminated urethane prepolymer and polyamine compound. Generally, the thermosetting urethane resin composition is preferably cured at the temperature between the room temperature and 140° C. for 1 to 60 minutes. By curing at the above condition, it is possible to reduce the influence of forming the polyurethane cover on the molded-rubber and to improve the productivity and workability. Curing the thermosetting urethane resin composition at the above condition yields a suitable cured product as a cover material.

In case of using the cured product of thermosetting urethane resin composition as a cover material (hereinafter may be referred to as a "polyurethane cover"), the thickness of the cover is preferably not less than 0.2 mm, more preferably not less than 0.3 mm, and preferably not more than 1.5 mm, more preferably not more than 1.3 mm. By making the thickness of the polyurethane cover thinner than 1.5 mm, which is thinner than that of the conventional cover, it is possible to prevent the resilience from being lowered by employing the relatively soft polyurethane cover. However, if the thickness of the cover is less than 0.2 mm, it will be difficult to form the polyurethane cover, because the thickness is too thin. Even if the polyurethane cover having the thickness of less than 0.2 mm can be formed, the tear-strength of the resultant polyurethane cover is low. Thus, the polyurethane cover will be easily torn or worn by the impact or contact with the clubface. In extreme cases, the solid core would be exposed.

In the present invention, the golf ball has no limitation on its structure. The golf ball of the present invention includes a two-piece golf ball where the solid core is covered with the above cover material and a multi-piece golf ball. The solid core may have single-layered structure, or multi-layered structure which comprises a center and at least one intermediate layer covering the center. The solid core with single-layered structure or the center of the multi-layered solid core, for example, without limitation, is preferably a molded body which is formed by vulcanizing a rubber composition. The rubber composition preferably comprises the dien rubber as a base rubber, a co-crosslinking agent and a cross-linking initiator.

As the diene rubber, a high-cis polybutadiene rubber having cis-bond in a proportion of not less than 40%, preferably not less than 70%, more preferably not less than 90% is preferably used in view of the superior repulsion property. The co-crosslinking agent includes, for example, an α,β-unsaturated carboxylic acid having 3 to 8 carbon atoms or a metal salt thereof. Typically preferred is acrylic acid and methacrylic acid or a metal salt thereof. As a metal forming metal salts, zinc, magnesium, calcium, aluminum, and sodium is preferably used. Particularly, zinc is more preferably used. The amount of the co-crosslinking agent to be blended in the rubber composition is preferably from 20 to 50 parts by mass based on 100 parts by mass of the base rubber. An example of the co-crosslinking agent is an organic peroxide such as dicumyl peroxide, 1,1-bis(t-butylperoxy)-3,5-trimethylcyclohexane, 2,5-dimethyl-2,5-di(t-butylperoxy)hexane, and di-t-butyl peroxide. Among them, dicumyl peroxide is preferable. The amount of the co-crosslinking agent to be blended in the rubber composition is preferably from 0.2 to 1.5 parts by mass, more preferably from 0.3 to 1.0 parts by mass based on 100 parts by mass of the base rubber.

Preferably, the rubber composition may further contain an organic sulfur compound to improve the repulsion property, in addition to the base rubber, the co-crosslinking agent and a crosslinking initiator. An example of the organic sulfur compound is a derivative of diphenyl disulfide such as a diphenyl disulfide and a pentachlorodiphenyl disulfide. As required, the rubber composition further contains a specific gravity adjusting agent such as zinc oxide and barium sulfate, antioxidant and color powder, and other additives.

The solid core with single-layered structure or the center is formed by press-molding the above rubber composition into the spherical body at a heating conditions. The condition for the press-molding can be determined depending on the rubber composition, but the press-molding is preferably carried out for 10 to 60 minutes at the temperature of between 130 to 200° C. Alternatively, the press-molding is preferably carried out for 20 to 40 minutes at the temperature of 130 to 150° C., and continuously for 5 to 15 minutes at the temperature of 160 to 180° C.

In the case of a multi-layered solid core including at least one intermediate layer, the intermediate layer has no limitation on its material. The intermediate layer preferably, for example, includes the rubber composition or the thermoplastic resin. In the case that the molded product of the rubber composition is used as an intermediate layer, the rubber composition aforementioned can be used. The examples of the thermoplastic resin used as a intermediate layer are an ionomer resin (HIMILAN produced by MITSUI-DUPONT Co., SURLYN produced by DUPONT Co., IOTEX produced by EXXON Co.), a polyester elastomer (Hytrel available from DUPONT-TORAY Co., LTD.), a polyurethane elastomer (ELASTOLLAN commercially available from BASF POLYURETHANE ELASTOMERS Co.), a polystyrene elastomer (Septon available from KURARAY Co.), a polyamide elastomer (PEBAX) can be used. Use of the ionomer resin as the intermediate layer is particularly preferable in view of its superior repulsion property and durability. Examples of the ionomer resin are one prepared by neutralizing a copolymer of olefin and unsaturated carboxylic acid with a metal ion or a terpolymer of olefin and unsaturated carboxylic acid ether with a metal ion. And it is possible to use a mixture thereof, to have desirable elasticity and stiffness. The metal ion for neutralizing includes alkali metal such as sodium ion and lithium ion, and alkaline earth metal such as magnesium ion and calcium ion, and divalent transition metal such as zinc ion and copper ion.

The intermediate layer may further contain a coloring agent such as titanium dioxide, a filler such as barium sulfate and other additives such as a dispersant, an antioxidant, an ultraviolet absorber, a light stabilizer, a fluorescent material, and fluorescent brightener in addition to the rubber composition or the thermoplastic resin as a base component of the intermediate layer. In the case of using thermoplastic resin, the method to cover the center with the intermediate layer, without limitation, includes an injection-molding method or a compression method, by which it is possible to cover the center with the thermoplastic resin. In the case of using the rubber composition for the intermediate layer, the center is covered with the rubber composition and then subjected to the vulcanizing molding.

The intermediate layer preferably has a Shore D hardness of not less than 30, more preferably not less than 35, and preferably has a Shore D hardness of not more than 80, more preferably not more than 75. If the intermediate layer has a Shore D hardness of less than 30, the intermediate layer is so soft that the golf ball with this intermediate layer exhibits a lowered repulsion property. On the other hand, if it is more than 80, the intermediate layer is so hard that the resulting golf ball imparts an inferior shot feeling to the golfer. The preferable thickness of the intermediate layer is 0.5 mm or more, more preferably 0.7 mm or more, and 4.5 mm or less, more preferably 4 mm or less. If the thickness of the intermediate layer is less than 0.5 mm, the resulting golf ball has a lower repulsion property, while if it is more than 4.5 mm, the resulting golf ball imparts a poor shot feeling.

The solid core used in the present invention preferably has a outer diameter of 39.8 mm or more, more preferably 40.2 mm or more, and preferably has an outer diameter of 42.4 mm or less, more preferably 42.2 mm or less. The solid core preferably has the deformation amount of not less than 2.20 mm, more preferably not less than 2.30 mm, and preferably has the deformation amount of not more than 3.50 mm, more preferably not more than 3.30 mm, when applying a load from 98N (10 kgf) as an initial load to 1275N (130 kgf) as a final load. The thickness of the polyurethane cover used in the present invention is so thin, thus the hardness of the solid core greatly influences the shot feeling. If the deformation amount is less than 2.20 mm, the solid core becomes so hard that the resulting golf ball imparts a larger impact to the golfer upon shot, while it is more than 3.50 mm, the solid core becomes so soft that the resulting ball has a lowered repulsion property and imparts a heavy shot feeling to the golfer upon shot.

The golf ball configured as described above, preferably has the deformation amount of not less than 2.20 mm, more preferably not less than 2.30 mm, and preferably has the deformation amount of not more than 3.50 mm, more preferably not more than 3.30 mm, when applying a load from 98N (10 kgf) as an initial load to 1275N (130 kgf) as a final load. If the deformation amount is less than 2.20 mm, the golf ball becomes so hard that the resulting golf ball imparts a larger impact given to the golfer upon shot, while it is larger than 3.50 mm, the golf ball becomes excessively soft, resulting in the low resilience. Further, the shot feeling becomes heavy.

EXAMPLES

The following examples illustrate the present invention, however these examples are intended to illustrate the invention and are not to be construed to limit the scope of the invention. Many variations and modifications of such examples will exist without departing from the scope of the inventions. Such variations and modifications are intended to be within the scope of the invention.

[Measurement and Evaluation Methods]

1. Stiffness Modulus

The thermosetting polyurethane resin composition was formed into a sheet having a thickness of about 2 mm, wherein test pieces each having a width of 13 mm and length of 60 mm were prepared. The stiffness modulus of each test piece was measured in accordance with JIS K 7106.

2. Compressive Deformation Amount (mm) of the solid Core and the Golf Ball

The deformation amount was measured when applying a load from 98N(10 kgf) as an initial load to 98 N as a final load of 1275 N(130 kgf) in terms of each of the solid core and the golf ball.

3. Shore D Hardness

The thermosetting polyurethane resin composition was formed into sheets each having a thickness of about 2 mm. The hardness of the sheets was measured by the using a spring-type Shore D hardness tester.

4. Repulsion Coefficient

An aluminum cylindrical body having a weight of 198.4 g was allowed to collide with each golf ball at the speed of 45 m/sec. The respective speeds of the cylindrical body and the golf ball before and after the collision were measured, and the repulsion coefficient of each golf ball was calculated from the respective speeds thus measured and the respective masses of the cylindrical body and the golf ball. The measurement was carried out five times, for each golf ball. The average of the measured values was regarded as the repulsion coefficient of each golf ball. The repulsion coefficient of each solid golf ball was represented as an index relative to 100 representing the repulsion coefficient of the golf ball No. 13. A greater index is indicative of a higher repulsion property.

5. Flight Distance (m)

Each golf ball was hit with a titanium driver (W#1) attached to a swing robot manufactured by golf laboratory Co. at the head speed of 45 m/sec. The flight distance from the hitting point to the point at which the golf ball fell to the ground, was measured.

6. Abrasion-Resistance

Each golf ball was hit with a commercially available pitching wedge attached to the swing robot at the head speed of 36 m/sec. The condition of the golf ball thus hit parts were visually observed and rated on four levels according to the following criteria.

Rating Criteria:

"E (Excellent)": The surface of the golf ball had few flaws.

"G (good)": The surface of the golf ball had a few flaws, which were at an unnoticeable degree.

"F (Fair)": The surface of the golf ball had clearly noticeable flaws and was slightly napped.

"P (Poor)": The surface of the golf ball was considerably shaved and conspicuously napped.

7. Coloring-Resistance Against Weather

Each golf ball was subjected to the weather-resistance test by using "Sunshine Super Long Life Weather Meter" manufactured by Suga Test Instruments Co., Ltd, according to the JIS D 0205 under the conditions: chamber temperature=63° C., humidity 50%, irradiation=60 hours, and 12 minutes' rainfall per 60 minutes'. The "L", "a", and "b" values of the color tone of the golf ball before and after the weathering test were measured by using calorimeter (CR-221 manufactured by Minolta Camera Co., Ltd.). The color tone differences were calculated according to the following equation.

$$\Delta E^*ab=[(\Delta L^*)^2+(\Delta a^*)^2+(\Delta b^*)^2]^{1/2}$$

The larger value of ? E*ab indicates the larger difference of the color tone.

8. Controllability 30 yard approach shots were conducted by ten golfers including professional golfers and top amateur golfers having a handicap of not greater than 10. The controllability of each golf ball was evaluated by the feeling upon a shot.

Rating Criteria:

"E (Excellent)": Number of the golfers who felt the golf ball to be easily controlled is more than eight "G (good)": Number of the golfers who felt the golf ball to be easily controlled is more than five.

"F (Fair)": Number of the golfers who felt the golf ball to be uncontrolled is more than five.

"P (Poor)": Number of the golfers who felt the golf ball to be uncontrolled is more than eight.

9. Shot Feeling

An actual hitting test was carried out by ten golfers including professional golfers and top amateur golfers having a handicap of not greater than 10. The shot feeling of each golf ball was evaluated by the feeling upon a shot.

"E (Excellent)": Number of the golfers who felt the good shot feeling is more than eight.

"G (good)": Number of the golfers who felt the good shot feeling is more than five.

"F (Fair)": Number of the golfers who felt the bad shot feeling is more than five.

"P (Poor)": Number of the golfers who felt the bad shot feeling is more than eight.

Manufacture of Golf Ball

1. Manufacture of the Solid Core

The rubber composition shown in Table 1 was vulcanized and formed at 160° C. for 20 minutes to obtain the solid core having a diameter 41.2 mm and a weight of 40.9 g. The compressive deformation amount of solid core was 2.83 mm.

TABLE 1

| Compound | Amount (parts by mass) |
| --- | --- |
| Butadiene rubber | 100 |
| Zinc acrylate | 36 |
| Zinc oxide | 10.4 |
| Dicumyl peroxide | 0.7 |
| Diphenyl disulfide | 0.5 |

Formulation: parts by mass

Butadiene rubber: "BR18" is high-cis polybutadiene (cis content: 96%) produced by JSR Corp., Zinc acrylate: "ZNDA 90S" produced by NIHON JYORYU KOGYO Co., LTD Zinc oxide: "Ginryo R" produced by Toho zinc Co., LTD Dicumyl peroxide: PERCUMYL D produced by NOF Corporation., Dibenzyl disulfide: produced by Sumitomo Seika Chemicals Co., LTD 2. Manufacture of Golf Ball As shown in table 2 and 3, the isocyanate group-terminated urethane prepolymer heated at 80° C. were mixed with each curing agent heated at the predetermined temperature (Curing agent adding temperature) to prepare a thermosetting urethane resin composition. Each solid core obtained above was held in a hemispherical mold having a dimple pattern, and the urethane resin composition was injected into the mold. Subsequently, the mold was inverted and mated with another hemispherical mold (also having a dimple pattern) into which the same urethane resin composition had been injected, and the urethane resin composition was pressure-molded at 80° C. for 30 minutes. After the curing, the resulting golf ball was removed from the molds, deburred, and coated with a white paint. In this way, there were obtained golf balls having a diameter of 42.7 to 42.8 mm and a mass of 45.2 to 45.7 g.

Alternatively, the thermoplastic ionomer resin and the thermoplastic urethane resin as listed in table 4 were used as a cover material of the golf ball, to obtain the golf ball. The cover comprising the thermoplastic ionomer resin and the thermoplastic urethane resin was prepared in the following process. Each of the thermoplastic ionomer resin and the thermoplastic urethane resin were mixed using a twin-screw kneading extruder to obtain the cover composition in the form of pellet.

The extrusion was conducted in the following conditions:

screw diameter=45 mm, screw revolutions=200 rpm, screw L/D=35, and the cover composition was heated to from 200° C. to 260° C. at the die position of the extruder. The cover composition thus prepared was molded into a hemispherical half shell, and the solid core was wrapped with the two half shells, followed by press compression molding at 150° C.

According to the measurement and evaluation methods described above, each golf ball was evaluated as to its compressive deformation amount, repulsion property, flight distance and abrasion resistance. The results obtained are shown in Table 2 to 4. In tables, the amount of the formulation was shown by mass parts. Furthermore, the details of the isocyanate group terminated polyurethane prepolymer and curing agents, which were used, are summarized below.

ADIPRENE LW520: hydrogenated MDI-PTMG isocyanate group-terminated urethane prepolymer produced by UNIROYAL Co., LTD., NCO content=4.8%, residual hydrogenated MDI content=not less than 0.5%.

ADIPRENE LW570: hydrogenated MDI-PTMG isocyanate group-terminated urethane prepolymer, produced by UNIROYAL Co., LTD., NCO content=7.5%, residual hydrogenated MDI content=not less than 0.5%.

Urethaneprepolymer A: IPDI-PTMG isocyanate group-terminated urethane prepolymer, NCO CONTENT=8.0% residual IPDI content=not less than 0.5%.

Urethaneprepolymer B: IPDI-PTMG isocyanate group-terminated urethane prepolymer, NCO content=12.0%, residual isophorone diisocyanate content=not less than 0.5%.

Urethaneprepolymer C: IPDI-PTMG isocyanate group-terminated urethane prepolymer, NCO content=6.0%, residual isophorone diisocyanate content=not less than 0.5%.

ADIPRENE LF950A: tolylene diisocyanate (TDI) isocyanate group-terminated urethane prepolymer, produced by UNIROYAL Co., LTD., NCO content=6.1%, residual tolylene diisocyanate content=not less than 0.1%.

Vibrathane B635: 4,4'-diphenylmethane diisocyanate (MDI)-PTMG prepolymer prepolymer, produced by UNIROYAL Co., LTD., NCO content=7.8%, residual tolylene diisocyanate content=less than 0.5%.

CUREHARD MED: 3,3'-diethyl-5,5'-dimethyl-4,4'-diaminodiphenylmethane, produced by IHARA CHEMICAL INDUSTRY Co., LTD, amine value=398 mgKOH/g, curing agent adding temperature: 100° C.

Baytec 110: a mixture of diethylenetoluenediamine and propylenecarbonate available from Bayer Co., amine value=430 mgKOH/g, curing agent adding temperature: 30° C.

VersalinkP-250: Polytetramethyleneoxide-di-paraamino benzoate produced by Air Products Co., amine value=250 mgKOH/g, curing agent adding temperature: 60° C.

Ethacure100: 3,5-diethylenetoluenediamine produced by Albemalre Co. amine value=630 mgKOH/g, curing agent adding temperature: 30° C.

Ethacure30: 3,5-dimethylthiotoluenediamine produced by Albemarle Co., amine value=530 mgKOH/g, curing agent adding temperature: 30° C.

LONZACURE M-CDEA: 4,4'-methylenebis(3-chloro-2,6-diethylaniline, produced by LONZA Co., amine value=297 mgKOH/g, curing agent adding temperature: 100° C.

HIMILAN 1855: a Zn-neutralized ethylene/methacrylic acid/butyl acrylate ionomer produced by MITSUI-DUPONT POLYCHEMICAL.

SURLYN 6320: a Mg-neutralized ethylene/methacrylic acid/butylacrylate ionomer produced by DUPONT Co.

ELASTOLLAN C95A: Polyether polyurethane elastomer produced by BASF Co.

TABLE 2

|  | Ball No | | | | | | |
|---|---|---|---|---|---|---|---|
|  | 1 | 2 | 3 | 4 | 5 | 6 | 7 |
| Cover composition | | | | | | | |
| NCO terminated Pu prepolymer | | | | | | | |
| Adiprene LW520 | 100 | 75 | 50 | — | — | — | — |
| Adiprene LW570 | — | 25 | 50 | — | — | — | — |
| Urethane prepolymer A | — | — | — | 100 | 50 | 100 | — |
| Urethane prepolymer B | — | — | — | — | 50 | — | 100 |
| Curing agent | | | | | | | |
| Cure hard MED(100° C.) | 15.3 | 17.5 | 19.6 | 25.5 | 28.7 | — | — |
| Bayteck 110 (30° C.) | — | — | — | — | — | 23.5 | 29.4 |
| Titanium oxide | 2 | 2 | 2 | 2 | 2 | 2 | 2 |
| Properties of Cover | | | | | | | |
| A:Stiffness modulus (MPa) | 86 | 119 | 196 | 204 | 255 | 121 | 192 |
| B:Shore D hardness | 41 | 51 | 58 | 52 | 55 | 43 | 51 |
| A/B | 2.1 | 2.3 | 3.4 | 3.9 | 4.6 | 2.8 | 3.8 |
| Properties of Golf ball | | | | | | | |
| Deformation amount (mm) | 2.77 | 2.72 | 2.66 | 2.66 | 2.64 | 2.70 | 2.65 |
| Repulsion coefficiency | 103 | 104 | 106 | 105 | 106 | 105 | 107 |
| W#1 Carry (m) | 231 | 234 | 236 | 234 | 236 | 236 | 237 |
| Coloring resistance (ΔE) | 1.8 | 2.4 | 2.8 | 3.4 | 3.6 | 4.2 | 4.9 |
| Sbrasion resistance | G | E | E | G | G | G | G |
| Controllability | E | E | G | E | G | E | E |
| Shot feeling | E | E | G | E | G | E | E |

Formulation: parts by mass

The golf balls No.1~No.7 used the cured product of thermosetting urethane resin as a cover material. The cover material has Shore D hardness of 41 to 58, and the ratio of the stiffness modulus to the Shore D hardness A/B is 2.1 to 4.6, each golf ball meets the conditions of the present invention. The entire golf balls exhibited high repulsion property and long flight distance. The obtained golf ball was each excellent in resilience, flight distance, and abrasion resistance, coloring-resistance.

And the golf ball No.1 to 7 used a cured product of the thermosetting polyurethane resin composition which includes the isocyanate group terminated urethane prepolymer containing at least one diisocyanate selected from the group consisting of 4,4'-dicyclohxylmethanediisocyanate, isophoronediisocyanate and cyclohexanediisocyanate as an isocyanate component. The coloring-resistance of the resultant golf ball was also excellent.

distance was so short. In the golf ball No.11, the ratio (A/B) was 5.2, the stiffness modulus was too large relative to Shore D hardness. Thus, spin rate was lowered, resulting in the low controllability of the golf ball. Further, the shot feeling of the golf ball was bad, because the stiffness modulus of the golf ball was too large.

In the golf balls No.12 to 15, the ratio (A/B) of each golf ball was less than 2.0, the flight distance was short, and the abrasion resistance and the shot feeling had the tendency to become lowered. Further, the coloring-resistance was remarkably lowered, because the aromatic isocyanate was used as the isocyanate component of the isocyanate group terminated polyurethane prepolymer.

TABLE 3

| | Ball No | | | | | | | |
|---|---|---|---|---|---|---|---|---|
| | 8 | 9 | 10 | 11 | 12 | 13 | 14 | 15 |
| Cover composition | | | | | | | | |
| NOC terminated Pu prepolymer | | | | | | | | |
| Adiprene LW520 | — | 100 | — | — | — | — | — | — |
| Adiprene LW570 | 100 | — | — | — | — | — | — | — |
| Urethane prepolymer B | — | — | — | 100 | — | — | — | — |
| Urethane prepolymer C | — | — | 100 | — | — | — | — | — |
| Vibrathane B635 | — | — | — | — | 100 | 100 | — | — |
| Adiprene LF950A | — | — | — | — | — | — | 100 | 100 |
| Curing agent | | | | | | | | |
| Cure hard MED (100° C.) | 23.9 | — | — | 31.4 | — | — | — | — |
| Bayteck 110 (30° C.) | — | 14.1 | 17.6 | — | — | — | — | — |
| Versa link P-250 (60° C.) | — | — | — | — | 39.3 | — | — | — |
| Ethacure 100 (30° C.) | — | — | — | — | — | — | 6.7 | — |
| Ethacure 300 (30° C.) | — | — | — | — | — | 18.5 | 6.7 | — |
| Lonzacure M-CDEA (100° C.) | — | — | — | — | — | — | — | 26.1 |
| Titanium oxide | 2 | 2 | 2 | 2 | 2 | 2 | 2 | 2 |
| Properties of cover | | | | | | | | |
| A:Stiffness modulus(MPa) | 296 | 30 | 85 | 308 | 64 | 76 | 80 | 90 |
| B:Shore D hardness | 65 | 36 | 38 | 59 | 46 | 48 | 48 | 52 |
| A/B | 4.6 | 0.8 | 2.2 | 5.2 | 1.4 | 1.6 | 1.7 | 1.7 |
| Properties of golf ball | | | | | | | | |
| Deformation amount (mm) | 2.61 | 2.85 | 2.81 | 2.59 | 2.74 | 2.71 | 2.70 | 2.68 |
| Repulsion coefficient | 107 | 98 | 100 | 106 | 100 | 102 | 101 | 100 |
| W#*1Carry (m) | 236 | 226 | 229 | 237 | 225 | 230 | 229 | 230 |
| Coloring resistance (ΔE) | 3.0 | 1.8 | 4.0 | 3.6 | 5.8 | 7.9 | 8.3 | 7.0 |
| Abrasion resistance | G | P | F | G | F | F | F | G |
| Controllability | P | E | E | P | G | G | G | F |
| Shot feeling | P | G | G | P | F | F | F | F |

Formulation: parts by mass

In the golf balls No.8 to 16, the stiffness modulus and Shore D hardness of the cover material did not satisfy the equation of the present invention. In the golf ball No.8, the shore D hardness of the cover material was 65, thus the hardness of the resultant cover was extremely high. As a result, the controllability was lowered due to the low-spin rate. Further, the shot feeling of the golf ball was lowered. In the golf balls No.9 and 10, the shore D hardness of the cover material was less than 40, the repulsion property of the resultant golf ball became lowered, thus the flight distance was short. Especially, in the golf ball No.9, since the ratio of the stiffness modulus (A) to the Shore D hardness (B) A/B was 0.8 and the stiffness modulus to the Shore D hardness was extremely small, the flight

TABLE 4

| Ball No | 16 | 17 | 18 |
|---|---|---|---|
| Cover composition | | | |
| Thermoplastic resin | | | |
| HIMILAN1855 | 100 | — | — |
| SURLYN 6320 | — | 100 | — |
| ELASTLLAN C95A | — | — | 100 |
| Titanium oxide | 2 | 2 | 2 |

TABLE 4-continued

| Ball No | 16 | 17 | 18 |
|---|---|---|---|
| Properties of cover | | | |
| A: Stiffness modulus (MPa) | 91 | 60 | 47 |
| B: Shore D hardness | 54 | 43 | 44 |
| A/B | 1.7 | 1.4 | 1.1 |
| Properties of golf ball | | | |
| Deformation amount (mm) | 2.70 | 2.77 | 2.77 |
| Repulsion coefficient | 98 | 97 | 99 |
| W#1 Carry (m) | 226 | 224 | 225 |
| Coloring resistance (ΔE) | 3.5 | 4.0 | 7.6 |
| Abrasion resistance | P | P | F |
| Controllability | F | G | G |
| Shot feeling | F | F | F |

Formulation: parts by mass

As can be seen from Table 4, in the case of using the thermoplastic resin as a cover material, the ratio A/B of each golf ball became small. And it is obvious that the stiffness modulus was small relative to the Shore D hardness. As a result, the flight distance of the resultant golf ball was short, and the shot feeling was also lowered. In the golf ball No.16 and 17 with an ionomer resin, the abrasion resistance of the cover was lowered. The reason is considered that the ionomer resin cover is more brittle than a thermosetting or thermoplastic urethane resin cover.

The golf ball of the present invention is excellent in the balance between flight distance and controllability by using the cured product of the thermosetting resin composition as a cover material, and satisfying the specific equation of the Shore D hardness and stiffness modulus of the cover material. Further, the shot feeling of the golf ball is improved by adjusting the Shore D hardness of the cover material ranging between 40 and 60. And the coloring-resistance, durability, and fright distance of the golf ball is also improved by using the resin composition which comprising the specified isocyanate terminated polyurethane prepolymer and the specified polyamine compound as a thermosetting resin composition.

This application is based on Japanese Patent application No. 2002-186539 filed on Jun. 26, 2002, the contents of which are hereby incorporated by reference.

While only certain presently preferred embodiments of the present invention have been described in detail, as will be apparent for those skilled in the art, certain changes and modifications may be made in embodiment without departing from the spirit and scope of the present invention as defined by the following claims.

What is claimed is:

1. A golf ball comprising a core and a cover,
wherein the cover has a thickness of 0.2 to 0.8 mm and is made from a cover material including a cured product of a thermosetting resin composition containing a thermosetting urethane resin composition;
the thermosetting urethane resin composition comprises an isocyanate group-terminated urethane prepolymer and a polyamine compound;
the isocyanate group-terminated urethane prepolymer contains an isocyanate component formed by at least one diisocyanate compound selected from the group consisting of 4,4'-dicyclohexylmethane diisocyanate, cyclohexane diisocyanate and isophorone diisocyanate;
the polyamine compound contains 3,3'-diethyl-5,5'-dimethyl-4,4'-diaminodiphenylmethane;
the stiffness modulus of the cover material is 80 to 260 MPa; and
the stiffness modulus and shore D hardness of the cover material satisfy the following equation:

$2.0 \leq A/B \leq 5.0, 40 \leq B \leq 55$

A: Stiffness modulus (MPa)
B: Shore D hardness.

2. A golf ball according to claim 1, wherein the stiffness modulus and shore D hardness of the cover material satisfy the following equation:

$2.0 \leq A/B \leq 4.0$.

3. A golf ball according to claim 1, wherein the shore D hardness of the cover material is 45 to 55.

4. A golf ball according to claim 1, wherein the thermosetting urethane resin composition consists essentially of the isocyanate group-terminated urethane prepolymer and the polyamine compound.

5. A method of producing a golf ball having a cover with a thickness of 0.2 to 0.8 mm that is made from a material including a cured product of thermosetting resin composition comprising:
selecting a cover material satisfying the following equation:

$2.0 A/B \leq 5.0$ $40 \leq B \leq 55$

A: Stiffness modulus (MPa)
B: Shore D hardness; and
covering a ball body with the cover material, wherein
the cover is made from a cover material including a cured product of a thermosetting resin composition containing a thermosetting urethane resin composition;
the thermosetting urethane resin composition comprises an isocyanate group-terminated urethane prepolymer and a polyamine compound;
the isocyanate group-terminated urethane prepolymer contains an isocyanate component formed by at least one diisocyanate compound selected from the group consisting of 4,4'-dicyclohexylmethane diisocyanate, cyclohexane diisocyanate and isophorone diisocyanate;
the polyamine compound contains 3,3'-diethyl-5,5'-dimethyl-4,4'-diaminodiphenylmethane; and
the stiffness modulus of the cover material is 80 to 260 MPa.

6. The method according to claim 5, wherein the stiffness modulus and shore D hardness of the cover material satisfy the following equation:

$2.0 \leq A/B \leq 4.0$.

7. The method according to claim 5, wherein the shore D hardness of the cover material is 45 to 55.

8. The method according to claim 5, wherein the thermosetting urethane resin composition consists essentially of the isocyanate group-terminated urethane prepolymer and the polyamine compound.

9. A golf ball comprising a cover,
wherein the cover has a thickness of 0.2 to 0.8 mm and is made from a cover material including a cured product of a thermosetting resin composition containing a thermosetting urethane resin composition;
the thermosetting urethane resin composition consists essentially of an isocyanate group-terminated urethane prepolymer and a polyamine compound;
the isocyanate group-terminated urethane prepolymer contains an isocyanate component formed by at least one diisocyanate compound selected from the group consisting of 4,4'-dicyclohexylmethane diisocyanate, cyclohexane diisocyanate and isophorone diisocyanate;
the polyamine compound contains 3,3'-diethyl-5,5'-dimethyl-4,4'-diaminodiphenylmethane
the stiffness modulus of the cover material is 80 to 260 MPa; and
the stiffness modulus and shore D hardness of the cover material satisfy the following equation:

$$2.0 \leq A/B \leq 5.0, 40 \leq B \leq 55$$

A: Stiffness modulus (MPa)

B: Shore D hardness.

* * * * *